(12) United States Patent
Studer (10) Patent No.: US 9,511,941 B2
(45) Date of Patent: Dec. 6, 2016

(54) CONVEYING DEVICE

(71) Applicant: Ferag AG, Hinwil (CH)

(72) Inventor: Beat Studer, Hinwil (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 14/926,856

(22) Filed: Oct. 29, 2015

(65) Prior Publication Data

US 2016/0046445 A1 Feb. 18, 2016

Related U.S. Application Data

(62) Division of application No. 13/988,871, filed as application No. PCT/CH2011/000241 on Oct. 7, 2011, now Pat. No. 9,254,962.

(30) Foreign Application Priority Data

Nov. 26, 2010 (CH) ...................... 1991/10

(51) Int. Cl.
| | |
|---|---|
| B65G 21/20 | (2006.01) |
| B65G 17/38 | (2006.01) |
| B65G 17/06 | (2006.01) |
| B65G 21/22 | (2006.01) |
| B65G 39/20 | (2006.01) |
| B65G 15/30 | (2006.01) |
| B65G 17/44 | (2006.01) |

(52) U.S. Cl.
CPC ............. *B65G 17/385* (2013.01); *B65G 15/30* (2013.01); *B65G 17/066* (2013.01); *B65G 17/44* (2013.01); *B65G 21/22* (2013.01); *B65G 39/20* (2013.01); *Y10T 29/49826* (2015.01)

(58) Field of Classification Search
CPC ................................ B65G 21/22; B65G 17/24
USPC .......................... 198/850–853, 837, 838, 831
See application file for complete search history.

(56) References Cited

U.S. PATENT DOCUMENTS

| | | | |
|---|---|---|---|
| 2,646,160 A | 7/1953 | Michna | |
| 2,766,635 A | 10/1956 | Schwarzkopf | |
| 3,107,778 A * | 10/1963 | Jordan | B65G 39/20 |
| | | | 198/834 |
| 3,550,755 A | 12/1970 | Noren | |
| 3,744,618 A | 7/1973 | Monne et al. | |
| 4,397,145 A | 8/1983 | Reist | |
| 4,638,906 A | 1/1987 | Winiasz | |
| 4,640,196 A * | 2/1987 | Dehne | E01B 25/10 |
| | | | 104/109 |

(Continued)

FOREIGN PATENT DOCUMENTS

| | | |
|---|---|---|
| DE | 1194319 | 6/1965 |
| DE | 1270498 | 6/1968 |

(Continued)

*Primary Examiner* — James R Bidwell
(74) *Attorney, Agent, or Firm* — Rankin, Hill & Clark LLP (57) ABSTRACT

A longitudinal guiding device for a conveying device includes at least one guide rail with at least one profile body, and a holding device with a slot-like receiver. The at least one profile body includes a longitudinally running, cross-sectionally concave recess that defines a guide surface for a conveying device. The at least one profile body further includes a longitudinally running, outwardly directed insert strip. The at least one profile body of the at least one guide rail is held on the holding device via the insert strip inserted into the slot-like receiver.

15 Claims, 8 Drawing Sheets

(56) References Cited

U.S. PATENT DOCUMENTS

| | | | |
|---|---|---|---|
| 5,009,630 A | 4/1991 | Kanehira et al. | |
| 5,076,422 A | 12/1991 | Clopton | |
| 5,620,084 A * | 4/1997 | Mensch | B65G 17/02 198/834 |
| 5,909,797 A * | 6/1999 | Van Den Goor | B65G 17/086 198/370.02 |
| 5,911,305 A | 6/1999 | Layne | |
| 7,275,638 B2 | 10/2007 | Rundqvist | |
| 7,731,021 B2 | 6/2010 | Melancon et al. | |
| 7,975,838 B2 | 7/2011 | Reist | |
| 2004/0140181 A1 | 7/2004 | Fandella | |
| 2006/0207470 A1 | 9/2006 | Pfeiffer | |
| 2011/0114456 A1 | 5/2011 | Oppliger et al. | |
| 2013/0277183 A1 * | 10/2013 | Studer | B65G 17/385 198/850 |

FOREIGN PATENT DOCUMENTS

| | | |
|---|---|---|
| DE | 2118232 | 11/1972 |
| DE | 3410086 | 10/1985 |
| DE | 29516872 | 3/1996 |
| DE | 10207687 | 9/2003 |
| DE | 10240487 | 3/2004 |
| EP | 0218237 | 4/1987 |
| EP | 0355080 | 2/1990 |
| EP | 1321389 | 6/2003 |
| EP | 1437312 | 7/2004 |
| EP | 1655242 | 5/2006 |
| EP | 1902978 | 3/2008 |
| EP | 1975093 | 10/2008 |
| FR | 1050098 | 1/1954 |
| FR | 1452213 | 2/1966 |
| GB | 734753 | 8/1955 |
| JP | 63-180617 | 7/1988 |
| JP | 2001-139122 | 5/2001 |
| JP | 2004-269259 | 9/2004 |
| JP | 2005-523219 | 8/2005 |
| JP | 2006-199414 | 8/2006 |
| MC | 328 | 5/1962 |
| WO | 00/27732 | 5/2000 |
| WO | 02/34650 | 5/2002 |
| WO | 2006/069163 | 6/2006 |
| WO | 2008/092287 | 8/2008 |

* cited by examiner

CONVEYING DEVICE

BACKGROUND OF THE INVENTION

Field of the Invention

The invention relates to a conveying chain for a conveying means of a conveying device, comprising a plurality of chain links which are connected to one another, wherein the chain links via joint connections are connected to one another in a manner pivotable in each case about a first axis and a second axis aligned perpendicularly to the first axis, into the conveying chain. The invention moreover relates to a chain link for a conveying chain according to the invention.

Description of Related Art

Chain conveyors, with which a conveying member, such as grippers or plate elements for example, is led along a revolving track through a conveying device by way of a conveying chain, are generally known.

Thus for example, the document EP-A-1 975 093 describes a side bow conveying chain which is formed from inner chain links and outer chain links. The individual chain links are connected to one another via a type of universal joint connection and have two pivot axes which are perpendicular to one another. The outer chain links moreover comprise connection locations, via which carrier plates can be fastened with a positive fit. The guiding of the conveying chain is effected here via sleeve-like projections on the outer chain links which lie on the guide track. This conveying chain has the disadvantage that this is still constructed of a multitude of different components, such as e.g. outer chain links and inner chain links.

A modular conveying system with a modularly constructed conveying belt is described in the document U.S. Pat. No. 5,911,305. The conveying belt itself is constructed of individual joints and comprises bending sections to the side, which engage around a guide strip. Although the conveying system is likewise constructed in a modular manner, individual components or links are only suitable for the design of a certain belt conveyor.

DE 2118232 describes a conveying device with a conveying chain which is constructed of chain links of the same type. The chain links each comprise a fork-like receiver, into which a coupling piece of an adjacent chain link engages, said adjacent chain link being connected to the fork-like receiver via a round rod designed as a joint pivot. The chain here has exclusively the function of a pulling means. Other functions are not assigned to the conveying chain. The conveying member which here consists of plates is fastened on the round rods which lead laterally away from the chain links.

EP-A-1 902 978 also describes a plate conveyor with individual carrier plates which are movably connected to one another. Runner rollers are fastened on the carrier plates. The carrier plates thus themselves form the chain links.

BRIEF SUMMARY OF THE INVENTION

It is the object of the present invention to then suggest a conveying chain which consists of as little as possible different components, is robust and simple to drive. Moreover, the conveying means should be movable in a reliable manner and with little wear. The connection between the individual chain links should moreover be simple and should be able to be created where possible without any tools. Despite this, the connection should reliably hold in different pivot positions. The conveying chain should moreover be designed in a flexible manner, so that different conveying systems, such as e.g. gripper conveyors or plate conveyors can be realised with the same conveying chain.

This object is achieved by the conveying chain according to the independent claim. The dependent claims contain preferred further developments of the invention.

The conveying chain according to the invention is characterised in that this, with regard to the shaping is preferably constructed of constructionally identical chain links, and the chain links in each case at a first end section comprise a receiver and at the second end section comprise a coupling body engaging into the receiver of an adjacent chain link. The receiver and the coupling body are now designed such that these can be connected to one another by way of an insertion-rotation movement, for forming the joint connection. Apart from the mentioned end sections, the chain links comprise preferably a middle section in each case between the first and the second end section. The term "adjacent chain link" here means the chain link which runs in front or runs behind, in the conveying chain.

The term "constructionally identical with regard to shaping" in particular is relates to end sections as well as middle sections, for connecting a conveying member, and which are formed identically with regard to design. The chain links do not need to be identical with respect to possible connection interfaces for attaching runner rollers, as described further below, but however are preferably likewise identical.

In a preferred further development of the invention, the coupling body comprises a joint head, and receiver a joint socket. The joint socket encompasses the joint head preferably beyond its equator in the operating position. Such a connection is also referred to as an enarthrodial joint in medical technology. The joint head is preferably connected to the base body, i.e. the middle section, of the chain link via a neck section. The joint head is usefully rigidly connected to the base body of the chain link. The joint socket comprises an introduction opening for introducing the joint head into the joint socket. The introduction opening for this is preferably directed to the adjacent chain link. The joint head, the joint socket and the introduction opening are now preferably designed such that the joint head, for forming the joint connection via an insertion-rotation movement, is inserted through the introduction opening into the joint socket and by way of a subsequent rotation movement can be secured against sliding out opposite to the insertion direction. The insertion movement is preferably effected in the longitudinal direction of the conveying member or conveying chain.

For this, the introduction opening and the joint head are preferably designed such that the joint head and thus the associated chain link can only be introduced into the joint socket of the adjacent chain link, when rotated in a certain angular position or in a certain angular region relative to the joining partner, i.e. the adjacent chain link, about the longitudinal axis of the conveying chain or the chain link. This angular position or angular region is selected or set such that the chain links cannot be decoupled during operation of the conveying chain, i.e., the mentioned angular position or the mentioned angular region corresponds to a twisting or rotation of two chain links coupled to one another, which these would never assume in all pivot positions relative to one another during operation of the conveying chain. This relates to the pivoting of the chain links relative to one another about the first and the second pivot axis A1, A2.

The joint connection can e.g. be designed such that the chain links are rotatable relative to one another by 360° about the longitudinal axis L of the chain link. The joint connection is further preferably designed such that the chain links are pivotable relative to one another only in a limited angular region or range of e.g. 5° to 30° about the second pivot axis A2. The pivotability can for example be limited by way of the design of the edge of the receiver or of the joint socket.

The coupling body, the receiver and the introduction opening are advantageously designed such that two chain links can only be connected to one another when these are rotated relative to one another about their longitudinal axis (L) by an angle in the range of 45° to 135° and in particular about 90°. This in particular relates to the embodiment of a joint connection with a joint head, a joint socket and a slot-like opening as described above.

According to a particularly preferred embodiment of such an insertion-rotation connection, the coupling body comprises a joint head with two flattened sides which lie opposite one another. The flattened sides preferably form two plane surfaces. The surfaces can lie parallel to one another. The joint socket for its part comprises a slot-like introduction opening which is directed to the adjacent chain link, for the insertion of the joint head. The slot-like opening as well as the laterally flattened joint head are thus designed and matched to one another such that the joint head can only be introduced into the joint socket when the two elements are at a certain angle or angular region to one another. The term "angle" here means a rotation angle about a rotation axis which runs in the longitudinal direction of the conveying chain and which is perpendicular to the axis A1 and A2. If the two chain links are equally aligned, then the rotation angle is 0°. The width of the slot-like opening is thus adapted to the width of the joint head between the two flattened sides. In an advantageous design, the slot-like opening corresponds to the (largest) cross section of the joint head which is flattened on two sides, or is somewhat larger. I.e., the slot-like introduction opening and the cross-sectional shape of the joint head are congruent.

The slot-like opening and the joint head flattened on two sides are then arranged on the chain link such that the angular positions of the joint socket and of the joint head relative to one another in the operational position lie outside the angle or the angle region which the parts must assume for joining together. The two chain links must be brought into an angular position relative to one another, in which the flattened joint head is aligned to the slot-like opening, for joining these together.

The joint head can e.g. have a spherical basic shape with the mentioned flattened sides. The joint socket is usefully designed in an equal and opposite manner to the basic shape of the joint head. The neck section has a smaller diameter than the maximal diameter of the joint head. The diameter of the neck section moreover can correspond to the width of the joint head between the two flattened sides, or be smaller.

The conveying chain with regard to the shaping and material can be constructed from constructionally identical chain links. The chain links are preferably designed in a single-part manner. The chain links can be manufactured as single-component or multi-component chain links, i.e. from one or more different materials. A single-component chain link means that the complete component is manufactured from the same material. In contrast, multi-component chain link means that the chain link is constructed from a combination of several, e.g. two different materials, and individual sections or parts of the chain link are manufactured from different materials. A single-component chain link can e.g. be obtained via inserts of material which is different to the base body. Moreover, a multi-component chain link can also be obtained by way of an injection moulding method, in which two or more different plastic materials are processed in different injection moulding steps, into a one-part component. Apart from this, it is also possible for the chain link to be coated with another material over part of the surface or the complete surface. This material for example has friction-reducing characteristics. The material can e.g. be PTFE or contain this. Thus e.g. one can envisage the chain links with regard to shaping and material being constructionally identical and either the coupling body or the receiver being coated with another material. One can also envisage two embodiment types of chain links which are constructional equal with regard to shaping being provided. One embodiment type of chain links thereby has a partial-surface or complete-surface coating with another material. The other embodiment type of chain links preferably has no coating. In this case, the coupling body as well as the receiver would be coated. The coating can be envisaged as a separate method step subsequent to an injection moulding method. The coating can also be a method step during the injection moulding method.

The individual, different materials of such a component could have characteristics which meet different functional tasks which individual regions of a component must fulfill.

The material or a material, from which parts of the chain link or the complete chain link can be manufactured, is preferably a plastic or a reinforced plastic. The material or a material can however also be metal, e.g. an iron metal such as steel or aluminium. If the chain link is manufactured from plastic, then this can be manufactured e.g. by way of injection moulding. If the chain link is manufactured of metal, then this can be manufactured by way of a casting method. The chain links are then corresponding metal cast parts.

It is possible for the chain link to be manufactured from plastic, and to comprise inserts such as guide sleeves, pins, receivers (joint socket), coupling bodies (joint head), ball bearings, complete runner rollers, rolling bodies, pivot bodies, etc., which are already integrated into the base body, of e.g. plastic, in the manufacturing method. The inserts thereby consist of a material which is different than the base body, e.g. metal. An injection moulding method is particularly suitable for manufacturing chain links with inserts, e.g., inserts can be provided, which, orientated in the longitudinal direction L, are embedded into the chain link and are designed in order to accommodate tensile forces.

A further object of the invention is also to keep the friction between the receiver and the coupling body as small as possible, in order to thus prevent excess wear. Different ideas are possible for solving this problem.

According to a first solution of this task, the chain link is a multi-component chain link manufactured from several, preferably two different plastic materials. Despite this, the chain link is preferably produced in a single-part manner. At least the joint head and the joint socket are manufactured from two different plastic materials. The two plastic materials are usefully selected such that the friction coefficient between the joint head and the joint socket and accordingly also the wear is as low as possible. The multi-component chain links, such as e.g. two-component chain links, of several, e.g. two different plastic materials can be manufactured in a multistage injection moulding method. In this case, the chain links are preferably designed constructionally identically with regard to shaping and material.

According to a particularly preferred embodiment of a multi-component chain link, in particular a two-component chain link, the one plastic material comprises a friction-reducing component, preferably PTFE (polytetrafluoroethylene), in particular PTFE in a quantity of greater than 0% and smaller than 20% (volume percent). Thereby, either the coupling body, i.e. the joint head, or the receiver, i.e. the joint socket, is manufactured from this plastic material. The plastic material of the counter-element in contrast preferably has no friction-reducing additions. The base material of the chain link can e.g. be POM (polyoxymethylene).

According to a second solution of the task mentioned above, the individual chain links of the conveying chain although being designed in a constructionally identical manner with regard to the shaping, this however is not the case with regard to the material. Thus the conveying chain with regard to the material of the chain links can be manufactured of a plurality of different embodiment types of chain links. Chain links of different embodiment types are preferably arranged in the conveying chain in an alternating manner. The individual chain links here however preferably consist of a single material.

According to a particularly preferred embodiment, the conveying chain comprises two embodiment types of chain links which with regard to the material are not constructionally identical. Chain links of these two embodiment types are in each case arranged in an alternating manner in the conveying chain. The materials of the embodiments of chain links which are not constructionally identical are preferably selected such that the joint head and the joint socket of a joint connection each have a low friction. This means that in the manner mentioned above, on the one hand the friction coefficient between the two components can be lowered, and on the other hand the wear on the contact surfaces can be minimised.

Thus e.g. the material of the first embodiment type of a chain link can be a plastic with a friction-reducing component, preferably PTFE, in particular PTFE in a quantity of larger than 0% and smaller than 20% (percentage by volume). The material of the second embodiment of a chain link is a plastic without PTFE. The (base) material of the first and second embodiment type can e.g. be POM or contain this.

If a conveying chain consists of several embodiment types of chain links, then the chain links of one embodiment type in each case have a specific colouring which differs from the colouring of the chain links of other embodiment types. In this manner, the chain links of different embodiment types can be optically simply differentiated from one another.

The chain links, independently of whether these are single-component or multi-component chain links, can preferably be manufactured by way of an injection moulding method in one or more injection moulding steps.

In a further development of the invention, the middle section of the chain link comprises first connection means for the non-positive and/or positive connection of the chain links to a conveying member or its conveying elements. The conveying chain with the conveying member forms a conveying means. The first connection means are preferably provided on a connection side of the chain link which is directed to the conveyed products. The first connection means can comprise plug-in (insertion) openings or detent hooks, wherein the conveying member comprises the accordingly complementary, second connection means. The connection between the conveying element and the chain links is effected e.g. via a plug-in connection, in which detent hooks hook into plug-in openings and lock (snap) therein. The detent hooks are e.g. designed in a spring-elastic manner and on inserting are bent laterally away from one another or to one another amid the application of force, so that they wedge into the plug-in receiver on locking or snapping in. The detent hooks can be designed in a tab-like manner. The detent hooks amid a force action must be laterally bent away again, so that the locking lugs can release from the detent (locking) position, for releasing the connection. Only then can the conveying element be released from the chain link. Through-openings, e.g. two tool openings can be provided in the region of the detent hooks, so that the release or removal of the conveying element from the chain link is also possible from the conveying surface and therefore also in the operationally ready condition of the conveying device. A tool, e.g. a pliers-like tool with clamping or spreading limbs can then be introduced through the tool openings, by way of which tool the detent hooks can then be bent away laterally and thus the hooking can be released. In this case, the detent hooks are preferably attached on the conveying element.

The conveying member can consist of plate-like elements which can be fastened on the chain links in the described manner. The conveying member can however also comprise grippers suitably fastened on the chain links.

The chain link in a further development of the invention can comprise a drive interface for the asymmetrical or symmetrical introduction of a drive force. The drive interface in particular is a toothing on the chain link for the purpose of forming an engagement with the toothing of a drive means. A drive interface for the asymmetrical introduction of a drive force means that the drive force is only introduced onto the chain link from one side. Accordingly, the chain link has corresponding interface means such as e.g. a toothing, only on one side, e.g. on the opposite side lying opposite the connection side to the conveying member. A drive interface for the symmetrical introduction of a drive force means that the drive force is introduced onto the chain link from two opposite sides. Accordingly, the chain link comprises interface means, e.g. a toothing, on two oppositely lying sides, e.g. in each case laterally and below the connection side to the conveying member or to runner rollers on the conveying means. The symmetrical force introduction has the advantage that with this, no counter force needs to be exerted onto the chain link, as this is the case with an asymmetrical force introduction for the purpose of preventing a yielding movement of the conveying chain.

The toothing is preferably designed in a plane. It extends in each case preferably over a surface section. The toothing can be designed in a serrated manner and comprise teeth, staves or ribs running transversely to the conveying direction or longitudinal direction. The toothing serves for the positive-fit connections to a drive means for the force transmission and movement transmission. The drive means and the drive interface can be designed for accelerating as well as for braking the conveying means. The features of the drive interface here are to be understood as independent features.

In each case, at least one runner roller can be attached on individual or all chain links. The at least one runner roller can already be attached with the single-part manufacture of the chain link, or be attached at a later stage via suitable connection interfaces such as a pivot bodies, onto the chain link which is preferably manufactured as one piece. The runner roller or runner rollers on the chain links serves for supporting the conveying means on a longitudinal guiding device and for the guided movement of the conveying means along a conveying track defined by a longitudinal guiding device. Preferably, in each case a runner roller is attached on both sides of a chain link, or a connection interface is provided for this. I.e. two runner rollers are arranged, e.g. symmetrically to one another, per chain link.

In a preferred further formation of the invention, in each case a runner roller is arranged on both sides of the chain link and is fastened on this. The runner rollers each form a support (contact) location to a guide rail of a longitudinal guiding device. The support locations can be support points or support lines or support surfaces. The support locations of the two runner rollers together with the joint connection lie on a common straight line. The support locations of the two runner rollers in particular together with the geometric centre of the joint connection lie on a straight line, or with the first pivot axis A1 of the joint connection lie on a common straight line. The geometric centre of the joint connection is e.g. formed by the intersection point of the first and second pivot axis A1 and A2.

The chain links can be designed in a lightweight construction manner, in particular in a hollow construction manner, with crossing chamber walls which enclose open and/or closed chambers. The chain links in particular can be manufactured in a lattice construction manner.

The joint connection between the individual chain links is moreover preferably designed such that the chain links via contact surfaces can transfer or transmit push pulses or compressive/push forces onto adjacent chain links. Preferably, the chain links or the joint connections are designed such that these can mutually transmit tensile forces as well as push pulses or compressive forces. By way of this, the conveying chain can be driven by way of tension forces as well as compression forces. This means that the conveying chain can be pulled as well as pushed. The conveying chain is secured with respect to compressive forces as well as tensile forces thanks to the joint connection according to the invention.

The invention moreover also relates to a chain link for a conveying chain. The chain link is characterised in that this in each case on a first end section comprises a receiver and on a second end section comprises a coupling body, wherein the coupling body is designed such that this can be introduced into the receiver of an adjacent chain link which is constructionally identical with regard to shaping. Moreover, the chain link is designed such that the receiver can assume a joint connection with the coupling body of the chain link which is adjacent in the longitudinal direction of the conveying chain, and the coupling body can assume a joint connection with the receiver of the other chain link which is adjacent in the longitudinal direction of the conveying chain, by way of an insertion-rotation movement.

The structural and functional features with respect to the chain links and which are described in this description in the context of the conveying chain, of course also apply to the independently claimed individual chain link, which is why these features or no longer described separately at this location.

The present invention is characterised by an economical manufacture of the individual components. A one-part, single-component or multi-component chain link or conveying element can be manufactured e.g. in a few method steps and with a lower effort with regard to manufacturing technology and logistics. The constructionally identical chain links as well as the preferably likewise constructionally identical conveying elements, with or without inserts can be manufactured in one working step by way of a single-stage or multi-stage injection moulding method. Moreover, pivot bodies, arms, roller element cages and/or complete runner rollers can also be integrally manufactured with the chain link or conveying element in this manufacturing step. Moreover, the complete rolling bodies can be integrally connected as an insert, to the chain link or the conveying element with the manufacture of this.

A further, independent invention relates to a longitudinal guiding device, in particular for a conveying device. The subsequently described longitudinal guiding device however also in combination with the conveying chain described above or with the conveying means described above and in their various designs can form particular embodiments of conveying devices.

The mentioned longitudinal guiding device typically comprises a guide rail as well as a holding device, on which the at least one guide rail is held or mounted by way of fastening means. The fastening means can be designed for the releasable or non-releasable fastening of the guide rail on the holding device. The fastening can be with a material fit (e.g. weld connection) or with a non-positive and/or positive fit.

The guide rails or their subsequently described profile bodies are however preferably repeatedly releasable from the longitudinal guiding device and repeatedly fixable thereon. In this case, the fastening means are preferably designed for a non-positive and/or positive fixation of the profile bodies on the holding device. The fastening means can e.g. be holding elements in the form of holding clips, holding tabs, holding strips, holding bars, holding slides or holding screws. The holding elements can e.g. be welded or attached in another manner, onto the holding device or onto the transverse connection elements, at a suitable location.

The longitudinal guiding device in then characterised in that the at least one guide rail is formed from at least one profile body which comprises a longitudinally running, cross-sectionally concave recess designed as a guide surface for a conveying means. The concave recess in particular is characterised by a completely or partly arched cross-sectional course. The mentioned recess thereby forms a guide channel for the conveying means or their runner rollers.

The guide surface in particular is designed for guiding runner rollers of a conveying means. The runner rollers can thereby lie on the guide surface which in this case corresponds to a running surface, in a surfaced or linear manner. The type of support (contact) of the guide rollers on the running surface (surfaced or linear) depends on the cross-sectional geometry of the runner rollers and the longitudinally running, concave recess.

The runner rollers can e.g. comprise a running surface of plastic. The rolling surface of the runner rollers can have a concave cross-sectional geometry The longitudinal guiding device or its guide rail are designed as a support for the conveying means or their runner rollers, wherein the support force is produced by the gravity force and/or centrifugal forces, acting on the conveying means.

According to a first embodiment of the invention, the profile body consists of an extrusion profile or continuous casting profile, wherein the at least one longitudinally running, cross-sectionally concave recess is incorporated into the profile cross section of the profile body with the extrusion or continuous casting method.

According to a second embodiment, the profile body is a formed (reshaped) profile which is manufactured from a tubular starting profile which is plastically formed in its cross section. The plastic forming is effected e.g. via a mechanical forming (reshaping) method. The tubular starting profile is e.g. designed in a thin-walled manner.

The solution according to the second embodiment permits the use of conventional tube profiles which are available on the market, such as round tubes, or rectangular tubes, at accordingly favourable conditions. The starting profile does not need to be manufactured separately, and the procurement of expensive tools and installations for manufacturing the starting profile can be done away with. The profile bodies formed from round tubes and with these, the guide rails, can be produced in an extremely inexpensive manner by way of this.

The guide rails can be designed as disposable components which when worn due to abrasion can be exchanged in an inexpensive manner and without any problem, on account of the inexpensive and simple manufacture of these guide rails. With the pairing of the guide rails/runner rollers, one can envisage the guide rails being designed such that these have a greater wear than the runner rollers, e.g. due to a lower hardness, in order thus to conserve the runner rollers, for reducing the wear of these.

According to a further development of the profile body of both embodiments, the profile body comprises at least two longitudinally running concave recesses which are arranged on its outer periphery and are each designed as guide surfaces. The profile body in particular can form two, three or four longitudinally running, concave recesses of the same or different cross-sectional geometry, which are designed as a guide surface for the conveying means.

The at least two longitudinally running, concave recesses preferably run parallel to one another. The at least two longitudinally running recesses are each preferably designed as guide surfaces, so that one of the longitudinally running recesses assumes the function as a guide surface in the longitudinal guiding device, in dependence on the assembly of the profile body on the holding device.

One can now envisage the at least two longitudinally running recesses having the same cross-sectional geometry and thus being able to be applied selectively in the conveying device as guide surfaces. As explained in more detail further below, this permits the exchange to a different guide surface if one of the guide surfaces, e.g. on account of wear, can no longer be used for guiding the conveying means.

However, one can also envisage the at least two longitudinally running recesses being designed in a different manner, i.e. having different cross-sectional geometries. This permits the application of the profile body in the longitudinal guiding device with guide rails with differently dimensioned guide surfaces. Specifically, differently designed guide surfaces for the runner rollers are necessary, depending on the conveying means or runner rollers which are applied in the conveying device.

The at least two longitudinally running, concave recesses are preferably arranged such that the profile body has a point-symmetrical cross-sectional shape.

If now a profile body or a guide rail formed from the profile bodies has several longitudinally running concave recesses which are designed as guide surfaces, then the profile bodies are fastened in the holding device in a manner such that one of the longitudinally running, concave recesses lies in the correct position for assuming its function as a guide surface. If the running surface of a profile body of a guide rail is worn above a fixed tolerance value, then another longitudinally running, concave recess of the same profile body can be used as a running surface. For example, by way of rotating the profile body about its longitudinal axis, a longitudinally running recesses lying on the outer periphery of the same profile body can serve as a running surface. The life duration of the guide rail or its profile body can be multiplied by way of the use of different longitudinally running, concave recesses of the profile body as a running surface.

In a further development of the profile body, according to the second embodiment, the at least one, longitudinally running, cross-sectionally concave recess in the formed profile is incorporated into the starting profile with a plastic forming method.

According to a further development of the profile body of both embodiments, the profile body amid the formation of an X-shaped cross-sectional shape comprises four longitudinally running, cross-sectionally concave recesses which are arranged or incorporated uniformly on its outer periphery. If the profile body is a formed profile according to the second embodiment, then the four longitudinally running recesses are shaped into a tubular starting profile by way of a plastic forming method.

According to a further development of the profile body of both embodiments, the profile body at least on its end sections forms a hollow chamber which is open at the face side and is preferably continuous in the profile longitudinal direction. In a particular development, the profile body is an in particular closed hollow profile. Closed hollow profiles are characterised by a high torsional stiffness with a simultaneously low weight. If the profile body is a hollow profile, then the concave recesses in the profile interior preferably form a cross-sectionally convey chamber wall which, as described hereinafter, serves e.g. as a centring surface for forming a surface contact or line contact with a centring means.

According to a further development of the profile body according to the second embodiment, the formed profile with its at least one longitudinally recess on the outer periphery is shaped from a round tube with a circular or oval cross section. The starting profile can also have a polygonal cross-sectional shape and e.g. have a square or rectangular cross section.

The profile body according to both embodiments can consist of metal such as steel (stainless steel) or aluminium, or of plastic.

The starting profile for manufacturing the formed profile according to the second embodiment can likewise be an extrusion profile or continuous casting profile. Starting profiles in the form of tube profiles, in particular of round tubes, can however e.g. also be manufactured of a rolled produce (e.g. sheet-metal) by way of a forming or bending method and subsequent welding method.

According to a further development of the profile body of both embodiments, the profile body comprises at least two longitudinally running, concave recesses which are adjacent one another and arranged on the outer periphery of this profile body, wherein the concave recesses enclose or form a longitudinally running, roughly radially outwardly directed insert strip, also called insert beading, for the insertion into a slot-like recess of a holding device. If the profile body is a formed profile of a hollow profile, then the insert strip can be designed in a double-walled manner by way of leading together two profile walls.

If the profile body comprises several longitudinally running recesses which are designed as guide surfaces, then preferably a corresponding number of insert strips is provided, which are designed and arranged in the profile body such that the one or the other longitudinally running recess assumes the position as the guide surface in the longitudinal guiding device, depending on which insert strip is inserted into the slot-like recess of the holding device.

If the profile body as described above comprises four longitudinally running, concave recesses amid the formation of an X-shaped cross-sectional shape, then the X-shape is formed by the insert strips between the longitudinally running concave recesses, said insert strips being directed roughly radially outwards on the outer periphery.

According to a further development of the longitudinal guiding device, the at least one guide rail is formed from a plurality of profile bodies which are arranged one after the other and end-to-end. The profile bodies can be designed in a straight manner for straight conveying sections and in a curved manner for curved conveying sections. The curvature is e.g. achieved by way of a bending method. Hereby, in particular, the straight profile bodies comprise two or more longitudinally running, concave recesses. Since the mentioned recesses as the case may be increase the bending stiffness, such profile bodies are not always particularly well suitable for the manufacture of bent profile bodies. For this reason, the bent profile bodies preferably in each case have only one such longitudinally running recess.

Two profile bodies forming an end-to-end joining can be aligned to one another without any offset by way of a centring means which is introduced into hollow chambers open at the face side, of the profile bodies, in a manner engaging over the profile and which is fixed radially in the hollow chambers. I.e. the transitions between two profile bodies are smooth and form no shoulders or channels.

The centring means can e.g. be a centring pin or a centring tube. The hollow chambers can e.g. form centring surfaces, on which the centring means bears and via which this is radially fixed. The centring surfaces are e.g. chamber walls or profile walls. The centring means can bear on the centring surfaces in a surfaced manner amid the formation of a surface contact, or in a linear manner amid the formation of a line contact. The profile bodies are thus stuck together in the longitudinal direction via the centring means and are thus automatically centred by the centring means.

The holding device of the longitudinal guiding device, according to a particular further development of the invention comprise slot-like receivers, via which the profile bodies of the guide rails are held. In particular, an insert strip of the profile body is inserted into the slot-like receiver, e.g. with a positive fit.

According to a further development of the longitudinal guiding device, this comprises two guide rails which are distanced to one another, led in a parallel manner, held via the holding device and preferably connected to one another.

If the longitudinal guiding device comprises two guide rails which are led next to one another, then the holding device comprises at least one transverse connection element with slot-like receivers, via which the profile body of the two guide rails are held. The transverse connection element as a result connects the guide rails to one another.

The longitudinal guiding device according to the invention further also relates to a method for manufacturing a profile body of a guide rail of a longitudinal guiding device described above. The method comprises the following steps: providing a premanufactured hollow profile, in particular tube profile; and incorporating a longitudinally running, cross-sectionally concave recess into the outer periphery of the hollow profile by way of plastic forming.

In a further development of the method according to the invention, this comprises the following step: incorporating two adjacent, longitudinally running, cross-sectionally concave recesses into the outer periphery of the hollow profile and creating a longitudinally running insert strip between the recesses by way of plastic forming.

Of course, method features can be combined with device features and vice versa. The mentioned longitudinal guiding device is particularly applied in a conveying device.

The described conveying means and longitudinal guiding device permit a three-dimensional design of the conveying path. Thus e.g. spiral-shaped conveying paths with simultaneous curves to the left or right and positive or negative gradients can be envisaged. The conveying device with conveying means and longitudinal guiding device is lightweight, but despite this is stable as well as low-wearing.

Less drive power is necessary due to the fact that the conveying means and in particular the conveying chain is relatively light and moreover low in friction. The drives can therefore be accordingly dimensioned in a smaller manner on account of this. Several comparatively small drives can thus be arranged distributed over the conveying device and locally drive the conveying means.

The conveying device with a conveying chain according to the invention can also be applied in foodstuff processing, since it is simple to clean. The cleaning agent e.g. can run away in an unhindered manner thanks to the design according to the invention. Moreover, the conveying device according to the invention permits a simple and rapid assembly. Existing conveying devices can be retrofitted in a simple and inexpensive manner with the conveying device according to the invention, or can be replaced by this.

BRIEF DESCRIPTION OF THE DRAWINGS

The subject matter of the invention is hereinafter explained in more detail by way of preferred embodiment examples which are represented in the accompanying drawings. In each case are shown schematically.

DETAILED DESCRIPTION OF THE INVENTION

Figure 1:
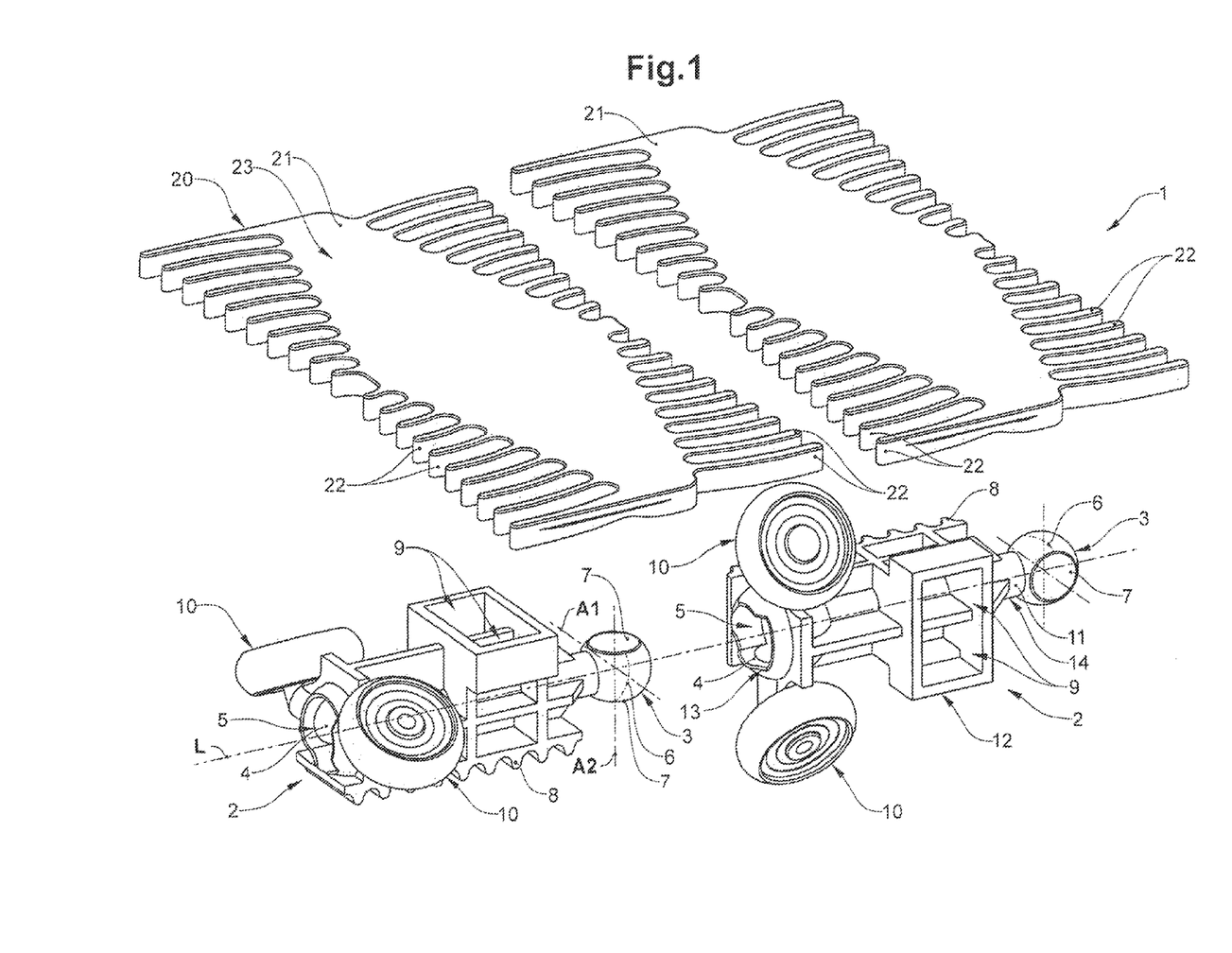
FIG. 1 is a perspective view of a first embodiment of a conveying means with a conveying chain according to the invention.
Figure 2:
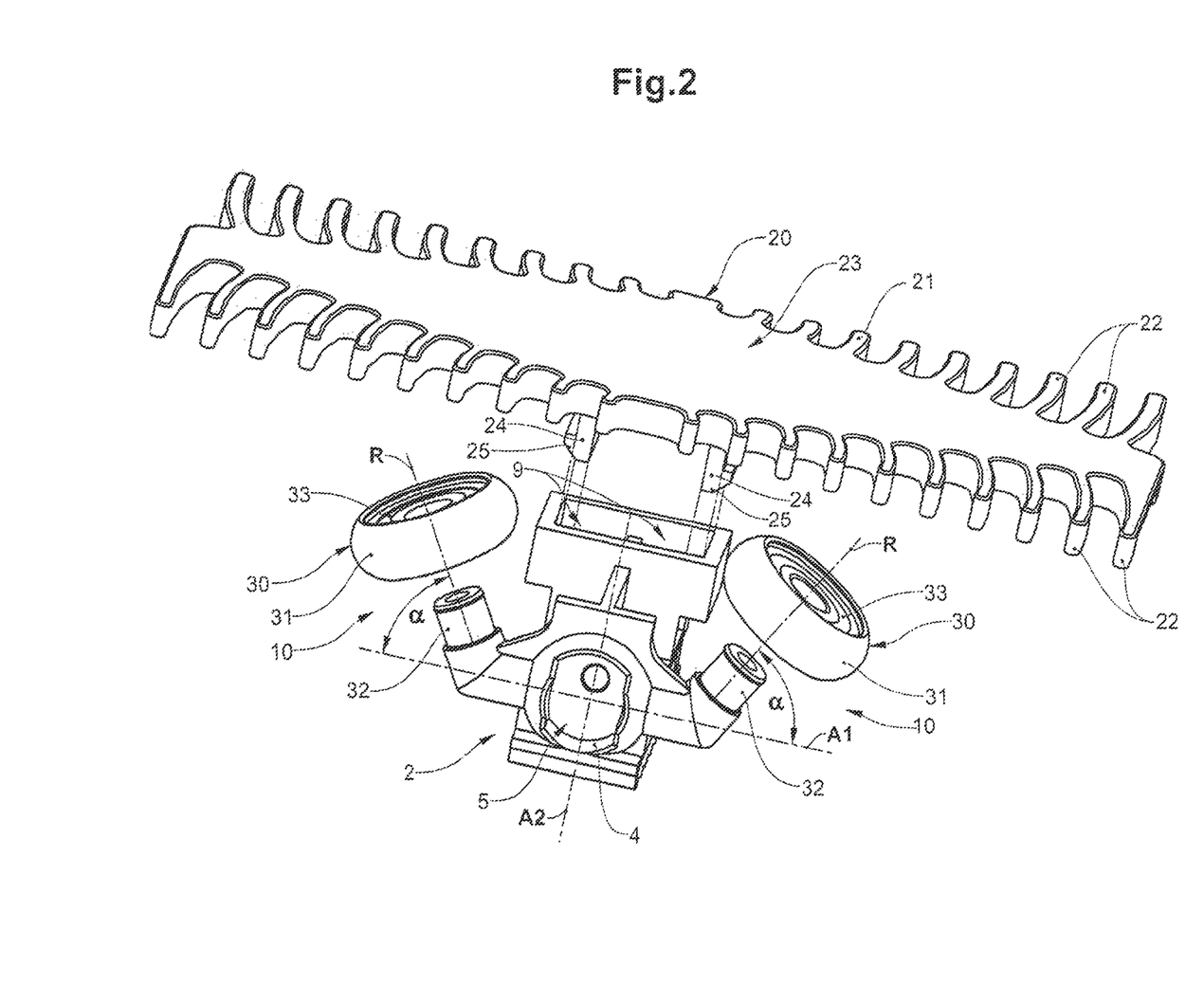
FIG. 2 is an exploded perspective view of the conveying means of the conveying device according to FIG. 1.
Figure 3:
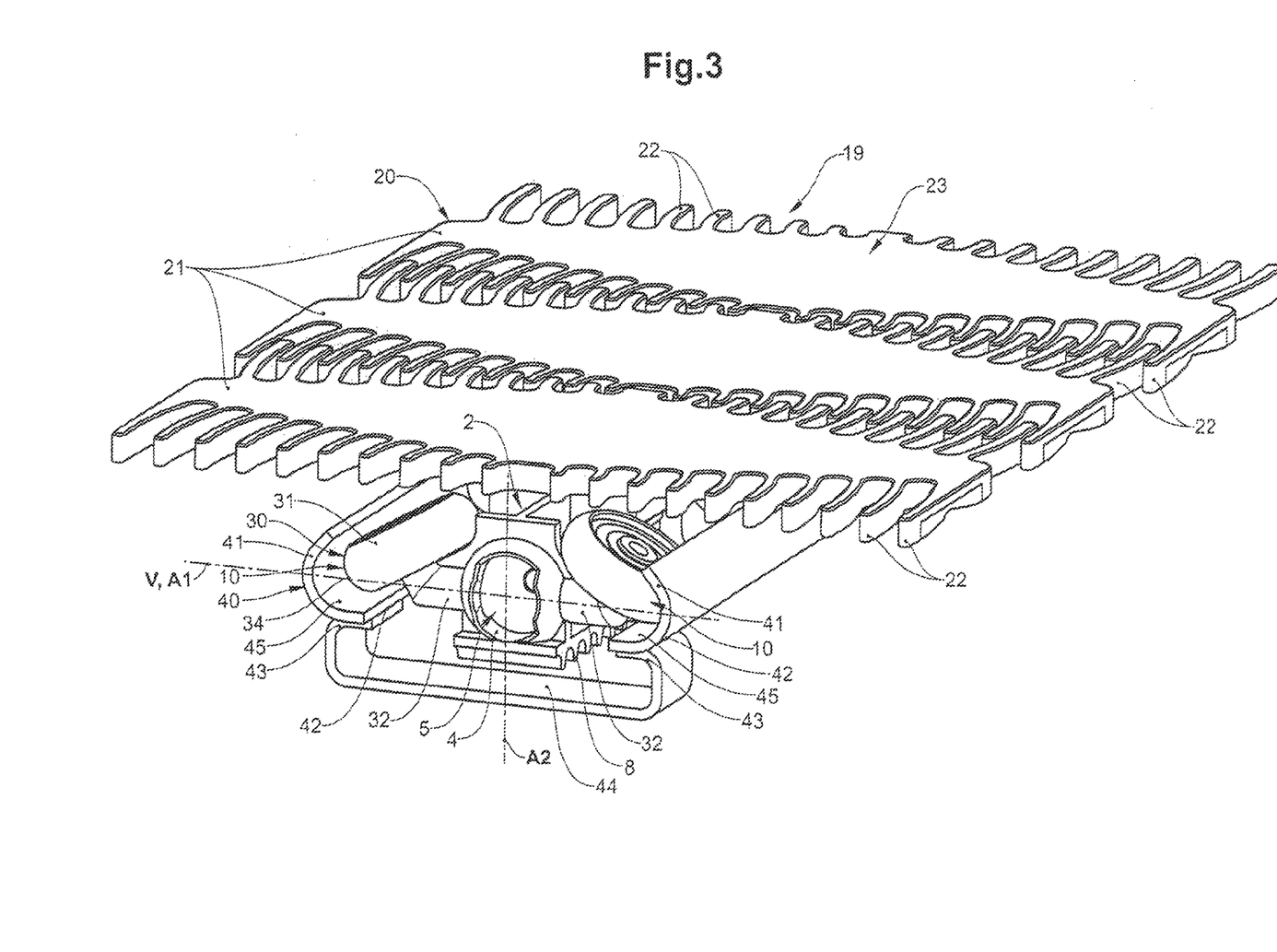
FIG. 3 is a perspective view of a conveying device with a conveying means according to FIGS. 1 and 2.

FIGS. 1, 2 and 3 show a conveying means 1 with chain links 2 which can be led together via an insertion-rotation connection, into a conveying chain. The conveying means further comprises a conveying member 20 with conveying elements 21 in the form of constructionally identical, plate-like carrier elements which are arranged one after the other into a conveying member 20. The plate-like carrier elements 21 form a conveying surface 23, on which the conveyed products are conveyed (not shown). Two connection means in the form of projecting detent hooks 24, via which the carrier elements 21 can be fastened via first connection means 9 onto the chain links 2, are attached on the lower side of the carrier elements 21 which is opposite to the conveying surface 23. The carrier elements 21 at their sides which face the preceding and subsequent conveying element 21 each comprise a plurality of prong-like, slightly bent projections 22 which are distanced to one another. These projections 22 are envisaged for a meshing engagement, in particular in curve regions, into likewise slightly bent, prong-like projections 22 of the adjacent, similarly designed carrier element 21.

The chain link 2 comprises a first end section 13, a second end section 14 and a middle section 12. The second end section 14 comprises a coupling body in the form of a joint head 3 which is connected to the base body of the chain link 2 via a neck section 11. The joint head 3 has a spherical basic shape. This basic shape is superimposed by two flatted sides 7 on the joint head, which lie opposite one another. The first end section 13 has a spherical receiver in the form of a joint socket 5. The joint socket 5 forms a ball-shell-like cut-out or recess. The spherical receiver moreover comprises an introduction opening 4 which is directed in the longitudinal direction to the adjacent chain link 2 and through which the joint head 3 can be introduced.

The joint head 3 of a chain link 2, as part of a conveying chain now in each case engages into the joint socket 5 of the adjacent chain link 2, wherein the joint socket 5 encompasses the joint head 3 beyond its equator, so that the joint head 3 cannot slide out of the joint socket 5 in the longitudinal direction opposite to the introduction direction, in the operating position.

The joint socket 5 comprises a slot-like introduction opening 4 for introducing the joint head 3 into this the joint socket 5. The introduction opening 4 corresponds to the (greatest) cross section of the joint head 3 flatted on both sides, or is somewhat larger. The slot-like introduction opening 4 as well as the laterally flatted joint head 3 are then designed relative to one another and are aligned to one another, such that the joint head 3 can only be introduced into the joint socket 5 when the two associated chain links 2 are rotated by an angle of about 90° relative to one another. The joint head 3 and the introduction opening 4 are equally directed in this introduction position. During operation of the conveying chain, the joint head 3 and the introduction opening 4 in contrast are never equally directed, but are always rotated or twisted at an angle to one another. In the non-rotated position of the chain links 2 relative to one another, the slot-like introduction opening 4 is therefore always perpendicular to the flattened sides of the joint head 3. For this reason, one of the chain links 2 must always be firstly rotated by an angle of 90° relative to the joining partner 2, when joining and releasing in the longitudinal direction L of the conveying chain.

The middle section 12 of the chain links 2 is designed in a box-like manner with two lateral hollow chambers 9 which serve as first connection means in the form of plug-in receivers. The already mentioned, spring-elastic detent hooks 24 are introduced into the hollow chambers 9 until they lock or detent on the chamber wall in a clamping manner with their detent lug 25 at the exit side, for creating a plug-in connection. The locking or detent hooks 24 with their locking or detent lugs 25 must be accordingly released from the detent position, for releasing the locking or detent connection.

The chain links 2 are each designed in a similar manner and apart from the already described joint connection comprise two runner rollers 10 which are each fastened laterally on this in a symmetrical arrangement. The runner roller 10 in each case comprises a rolling body 30 which is mounted via a ball bearing 33 on an axle body 32 and has a rolling surface 31. The axle body 32 is preferably integrally formed on the chain link 2, wherein the rolling body 30 is stuck onto an axle stub of the axle body 32 via the ball bearing 33. The axle body 32 is an angled component part which leads laterally outwards from the chain link 2 and with a connecting axle stub is directed obliquely upwards to the conveying member 20. The axle body 32 is designed such that the rotation axis R of the runner roller 10 encloses an acute angle $\alpha$ of less than 45° and greater than 10°, preferably from 20° to 40°, in particular from 25° to 35°, with the first pivot axis A1. The two rotation axes R of the rolling body pairing run to one another towards the chain link 2 and run apart towards the conveying member 20.

The runner rollers 10 each form support or contact points 34 to the guide rail 41. The support points 34 of the two runner rollers 10 together with the first pivot axis A1 of the joint connection lie on a common straight line V.

The chain link 2 moreover on the opposite side of the connection side directed to the conveying member 20 comprise a plane and surfaced toothing 8, which can be brought into engagement with the toothing of a drive means (not shown).

FIG. 3 shows a conveying device 19 which additionally to the conveying means 1 comprises a longitudinal guiding device 40 with two guide rails 41 which run parallel and at a distance to one another and are connected to one another via transverse connection elements 44. The transverse connection elements 44 serve for holding together the two guide rails 41 and as a spacer, in particular for ensuring a constant distance between the two guide rails 41. The transverse connection elements 44 are designed in a C-shaped manner and at the two ends comprise a bend section 43 which is directed to the respective guide rail 41. The end sections of the bend sections 43 run parallel to oppositely lying end sections of the guide rails 41. A surfaced connection zone 42 is formed in this manner, via which the transverse connection elements 44 are connected to the guide rail 41 via a material-fit connection (e.g. bonding, welding, soldering). The transverse connection elements 44 can consist of a bent rolled product. The transverse connection elements 44 can in particular be formed from sectioned, milled or punched strips of a rolled product. The rail profiles 41 in each case comprise concave running surfaces 45 which are arched in cross section and are in the form of a guide channel which are open to the runner rollers 10, i.e. which are open to one another. The rolling body 30 runs with its rolling surface 31 on the running surface 45. The rail profile 41 can be an extrusion profile of a steel or aluminium material. Moreover, the rail profile 41 can also be a bent or rolled product of metal, in particular or a steel or aluminium material. Moreover, the rail profile 41 can also be of a plastic or a reinforced plastic and/or of a coated plastic.

Figure 4A:
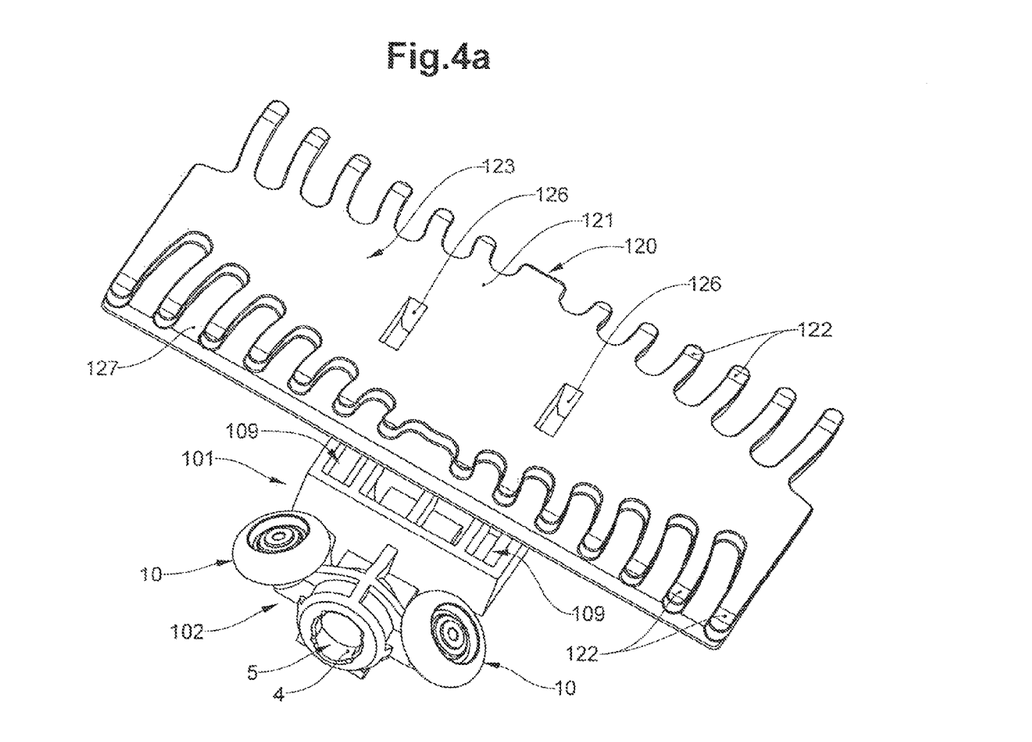
FIGS. 4a-4b are perspective views of a further conveying means with a first conveying chain according to the invention.
Figure 4B:
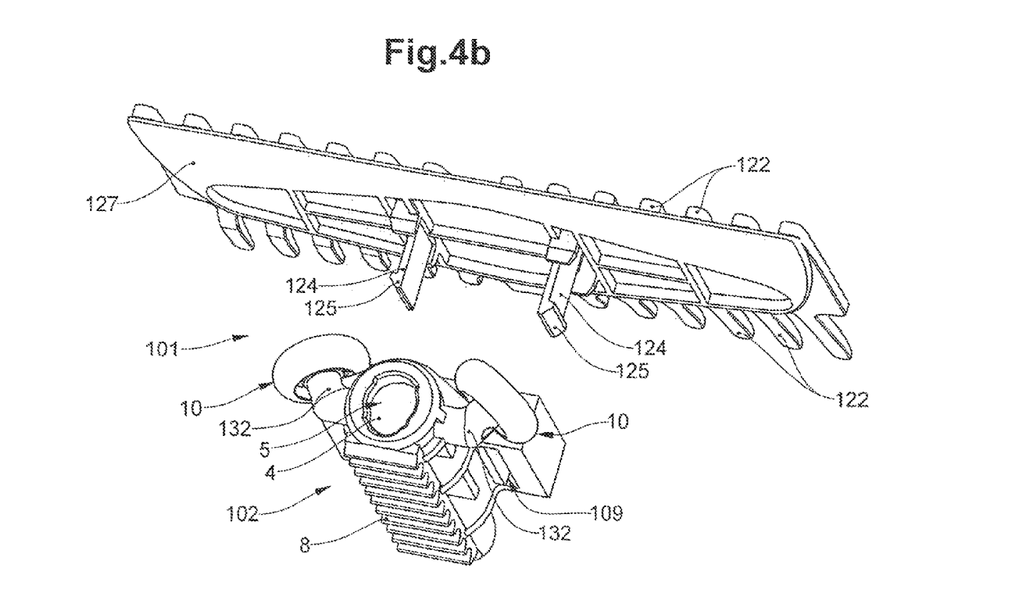

The conveying means 101 according to FIGS. 4a and 4b likewise comprises a conveying chain of a plurality of chain links 102. The chain links 102 with regard to the essential features are constructed in the same manner as the chain links 2 according to FIGS. 1 to 3. Here too, the chain link 102 on a first end section comprises a receiver into the form of a joint socket 5, as well a joint head 3 on a second end section. The joint socket 5 moreover also here comprises a slot-like introduction opening 4. The insertion-rotation connection is effected in the same manner as in the embodiment example according to FIGS. 1 to 3 and is therefore not described in more detail at this location. Moreover, the chain link 102 likewise comprises a toothing 8 of the already described type. The runner rollers 10 are formed via axle bodies 132 on the chain link 102 in the same way and manner as according to the FIGS. 1 to 3. The plug-in receivers on the connection side directed to the conveying member 120, on the middle section of the chain link 102 are slightly modified in their design. Here too however, two lateral chambers 109 are formed, through which detent hooks 124 are led and with their detent lugs 125 hook with the chamber wall at the exit side.

The plate-like carrier elements 121 of the conveying member 120 are likewise slightly modified with respect to the embodiment example according to FIGS. 1 to 3. The plate-like carrier elements 121 on both sides which in each case face the preceding and subsequent adjacent carrier elements 121 each have a plurality of prong-like projections 122 which are distanced to one another and slightly bent, for a meshing engagement into likewise, slightly bent, prong-like projections 122 of the adjacent carrier element 121. The prong-like projections 122 however in each case on one side of the carrier element 121 are supported by a guide base 127, so that the prong-like projections 122 of the adjacent conveying element 121 which engage in a meshing manner and are not supported by a guide base, are optimally led.

The carrier element 121 analogously to the embodiment example according to FIGS. 1 to 3 comprises two detent hooks 124 which each have a detent lug 125 and are arranged distanced to one another transversely to the longitudinal direction. The connection of the carrier element 121 and chain link 102 is effected in the same manner as FIGS. 1 to 3. Moreover, in each case two tool openings 126 are provided in the region of the detent hooks 124, on the carrier element 121. A tool, e.g. a pliers-like tool with clamping or spreading limbs can then be introduced through the tool openings 126, by way of which tool the two detent hooks 124 can be laterally bent away and thus the hooking can be released.

Figure 5A:
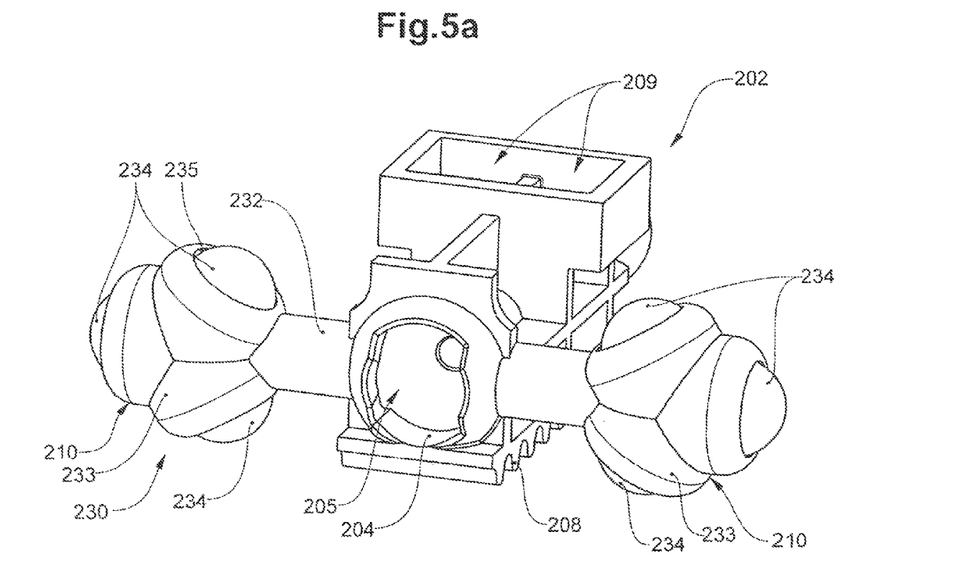
FIGS. 5a-5b are perspective views of a further embodiment of a chain link according to the invention, with runner rollers.
Figure 5B:
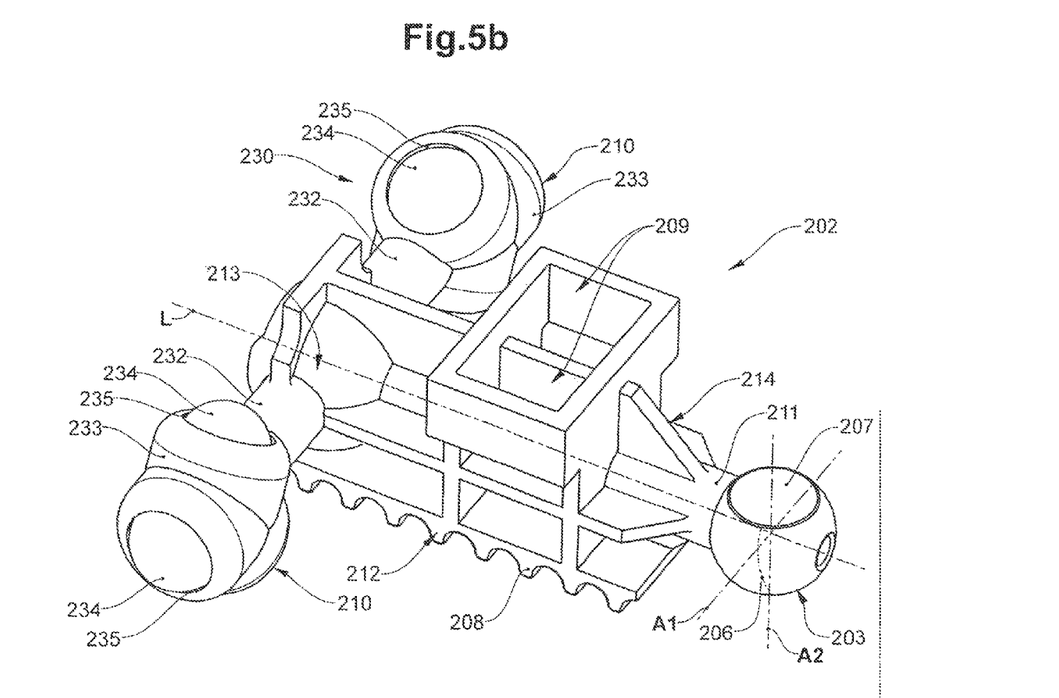

FIGS. 5a and 5b show a further embodiment of a chain link 202 with a joint connection according to the invention, wherein the chain link 202 of this embodiment differs only by way of the design of the runner rollers 210 and their connection onto the chain link 202. For this reason, the corresponding features between the two mentioned embodiments of chain links 2, 202 and their functionalities are hereinafter no longer described in detail. Instead, the respective designs with regard to the FIGS. 1 to 3 are referred to.

The chain link 202 likewise comprises two runner rollers 210 which are arranged on both sides of this. The joint socket 205 as part of a first end section 213, and the joint head 203 with flattened sides 207 as part of a second end section 214 are likewise connected to one another via a middle section 212. The joint socket 205 here is also designed such that this encompasses the joint head 203 of the adjacent chain link 202 beyond its equator 206. The middle section 212 in the known manner is designed in a box-like manner with two lateral hollow chambers 209 which serve as plug-in or insertion receivers. The plug-in connection is effected as already described in FIGS. 1 to 3, which is referred to with respect to this. The chain link 202 likewise comprises a toothing 208 which likewise extends from the first end section 213 with the joint socket 205 beyond the middle section 212 up to the second end section 214 with the joint head 203.

The runner roller 210 according to the present embodiment comprises a rolling body 230 which comprises three ball elements 234 which are arranged in recesses 235 of a roller element cage 233. The ball elements 234 are mutually supported in the roller element cage 233 and to the outside form a support or contact point for the rolling guidance and support of the rolling body 230. The contact point to the guide rail (not shown) in each case lies in the region of a ball segment of the ball element 234 which projects out of the roller element cage 233. The roller element cage 233 comprises suitable recesses 235 for receiving and rotatably holding the ball elements 234, wherein the recesses 235 or their openings are designed such that the ball elements 234 cannot fall out of the roller element cage 233. The ball elements 234 in the roller element cage 233 are arranged in a plane spanned by the two pivot axes A1 and A2 in the non-pivoted position of the chain links 202, wherein two adjacent ball elements 234 in each case enclose an angle of 120°.

The rolling bodies 230 are attached laterally on the chain link 202 via a rigid axle arm 232, also called connection arm. The axle arms 232 here are designed parallel to the first pivot axis A1. They could however also be aligned differently. The roller element cage 233 can however be stuck onto the chain link 202 via the axle arm 232. However, it is also possible for the roller element cage 233 to be designed in a single-part manner together with the chain link 202 and the axle arm 232. This is independent of the specific design of the rolling body 230 and of the chain link. The rolling bodies 230 here are pressed through openings into the recesses 235 of the roller element cage 233, for creating the rolling body 230.

Figure 6A:
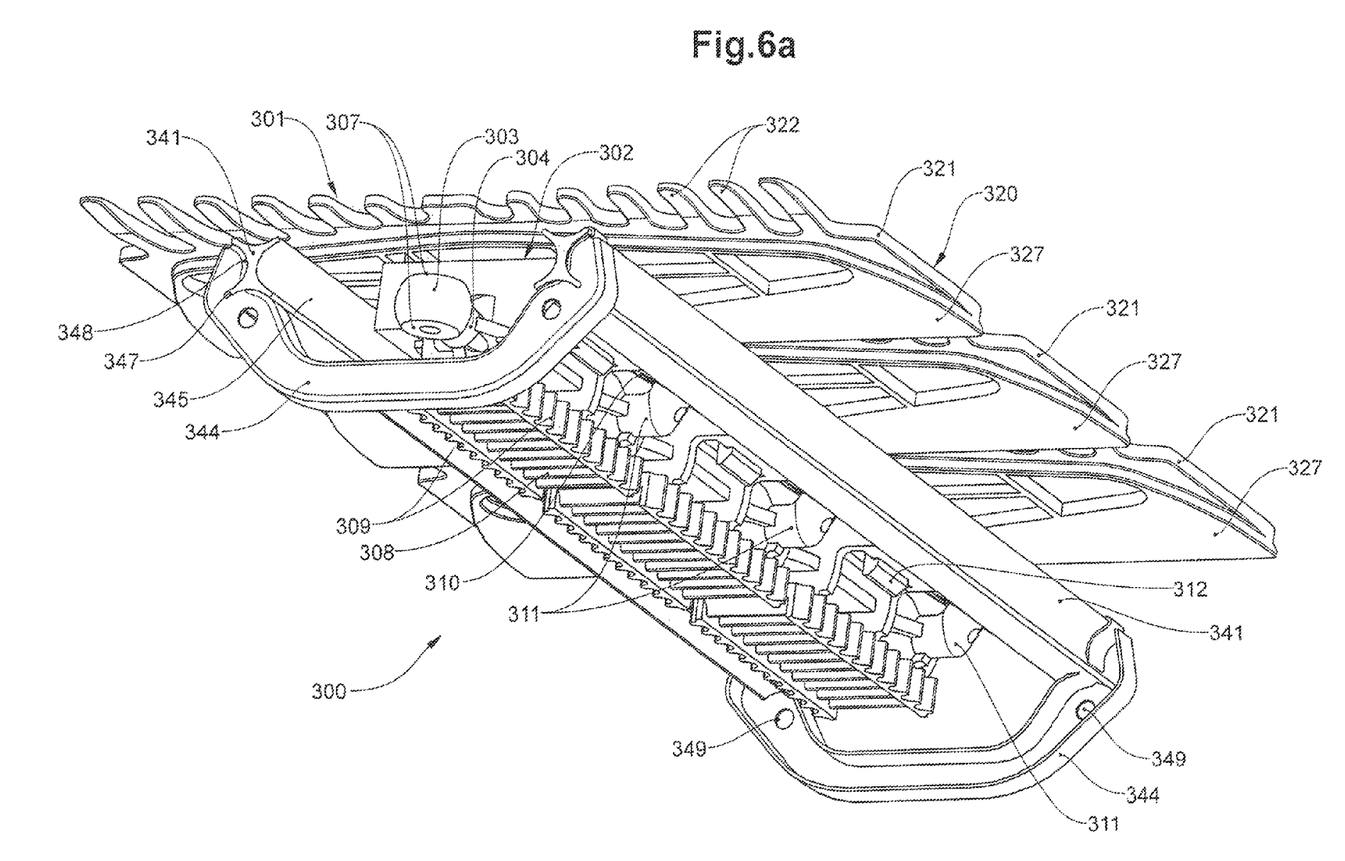
FIGS. 6a-6b are perspective views of a further embodiment of a conveying device with a conveying means.
Figure 6B:
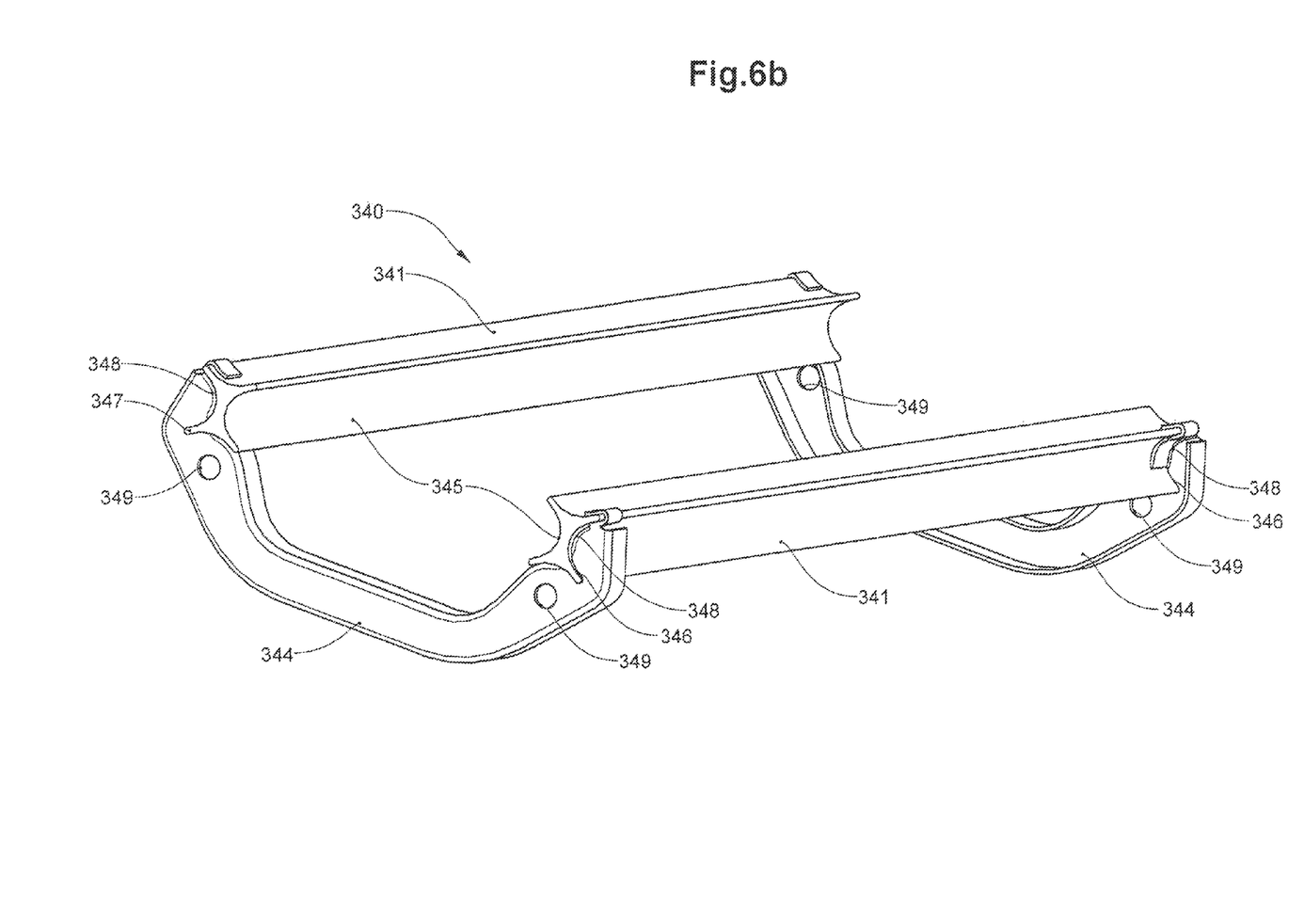

FIGS. 6a and 6b show a further embodiment of a conveying device 300 comprising a conveying means 301 which is composed of a conveying member 320 and a conveying chain, as well as a longitudinal guiding device 340, via which the conveying means 301 is led along a conveying path. The conveying member 320 is designed analogously to the conveying member 120 according to FIG. 4a and is therefore not described in all details at this location. The conveying member 320 is likewise composed of individual conveying elements 321 which engage into one another in a meshing manner via prong-like projections 322. The engaging, prong-like projections 322 of the adjacent conveying element 321 on the one side of the conveying element 321 are led by a guide base 327. The conveying elements 321 are connected to the chain links 302 via detent hooks 312 in the already described way and manner.

The conveying chain is composed of chain links 302 according to the invention. The chain links 302 correspond essentially and, with respect to the joint connection, completely to the chain link 102 according to FIG. 4b. The single difference lies in the fact that the present chain links 302 additionally to a toothing 308 attached on the opposing side, in each case comprise a lateral toothing 309 which on both sides of the chain link 302 is arranged directed to the guide rails 341 of the longitudinal guiding device 340. This lateral toothing 309 has the advantage that the conveying chain can be driven from both sides via the toothing 309. The drive hereby with a drive toothing engaging at both sides not only produces a pressing force onto the lateral toothing 309 of the conveying member, but simultaneously also the necessary counter-force on the oppositely lying side which prevents the conveying means 301 from escaping the pressing force.

The chain link 302 moreover likewise has an insertion-rotation connection with a joint head 303 with flattened sides 3097 which engages into a joint socket on the adjacent chain link (not shown). The joint head 303 is connected to the base body of the chain link 302 via a neck section 304. In an analogous manner to FIG. 3, the chain link 302 moreover comprises runner rollers 310 which are rotatably fastened laterally on the chain link 302 via angled axle arms 311.

The longitudinal guiding device 340 is likewise formed from two guide rails 341 which are led parallel next to one another and are connected to one another via transverse connection elements 344. The transverse connection elements 344 here are designed in a U-shaped manner and have a U-shaped cross-sectional shape which contributes to the stiffness and bending strength. The transverse connection elements 344 at their free end sections each have a slot-like recess 346, into which an insert strip 347 of the guide rail 341 is inserted and is fixed via a weld connection 348. The longitudinal guiding device 340 can be fastened on holders (not shown) via fastening openings 349 on the transverse connection elements 344. The guide rail 341 has a running surface 345, along which the runner roller 310 rolls. The running surface 345 is designed in the form of a concave guide channel which is arched in its cross section.

Figure 6C:
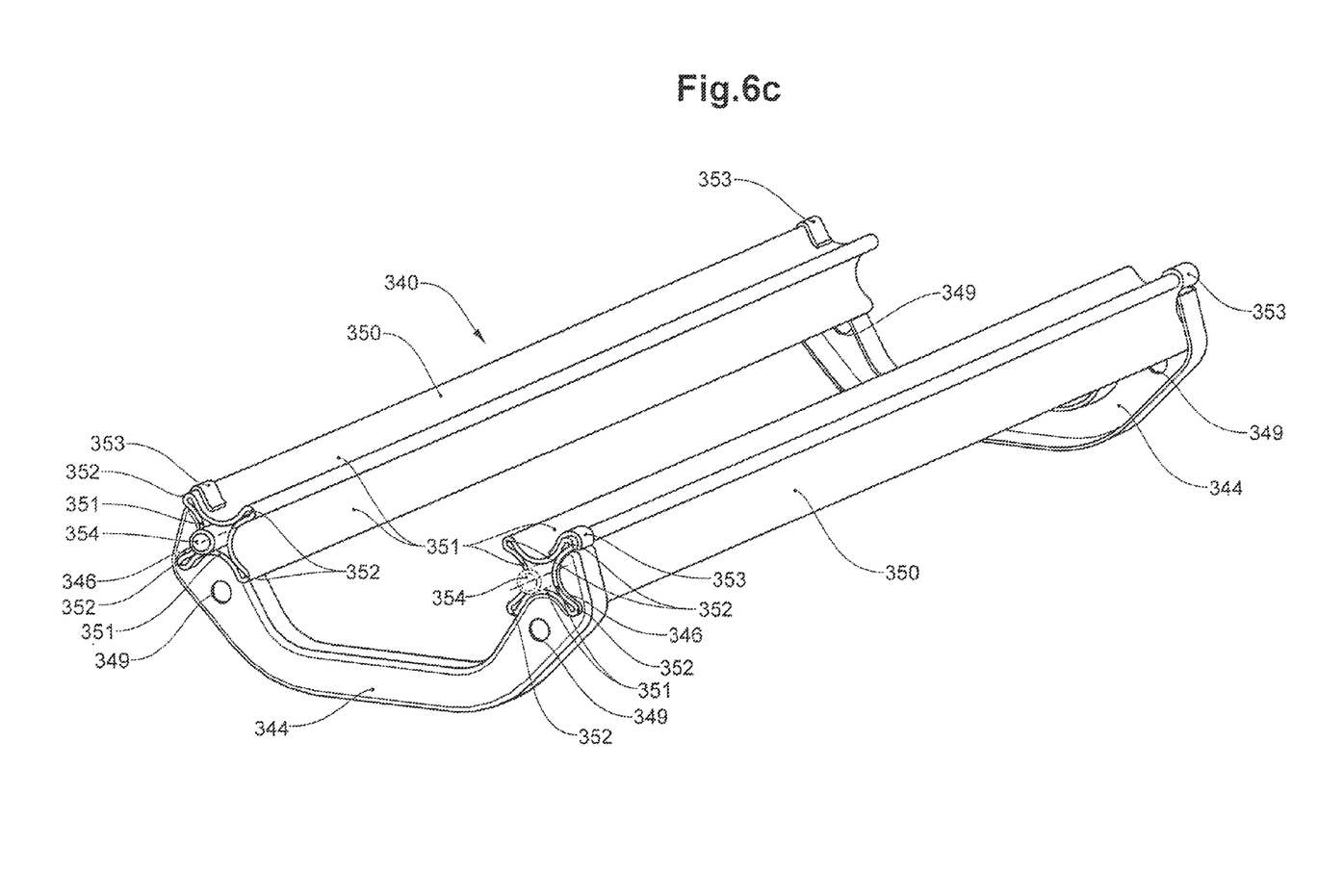
FIG. 6c is a perspective view of a further embodiment of a longitudinal guiding device.

FIG. 6c shows a further embodiment of a longitudinal guiding device 340. The longitudinal guiding device 340 in FIG. 6c has the same transverse connection elements 344 as the longitudinal guiding device 340 in FIG. 6b. In contrast to the guide rails 341 in FIG. 6b, formed guide rails 350 are connected via the transverse connection elements 344 in FIG. 6c. The formed guide rails 350 each consist of an initially rotationally symmetrical metal tube with a round cross section and a wall thickness for example of 0.5 mm to 5 mm, whose cross section was formed (reshaped), in a mechanical and plastic manner.

The formed guide rails 350 have a point-symmetrical and X-shaped cross section with four identically shaped outer side regions of the cross section. Each of the four outer side regions has a section which can be used as a running surface 351. This section or this running surface 351 is designed in the form of a concave guide channel which is arched in cross section.

Insert strips 352 which are inserted into the slot-like recesses 346 of the transverse connection elements 344 and are fixed for example with a non-positive and/or positive fit by fastening means 353 in the form of holding tabs are formed between the running surfaces 351 of the formed guide rails 350. The holding tabs 353 can be released and fixed in a repeated manner and permit a simple removal and a simple insertion of the insert strip 352 into the slot-like recesses 346. The formed guide rails 350 can be fastened on the transverse connection elements 344 in a rapid and simple manner and be separated from the transverse connection elements 344 in a rapid and simple manner by way of this. In this manner the formed guide rails 350 of the longitudinal guiding device 340 can be replaced in a simple and quick manner, for example in the case of wear or a defect. The guide rails 350 are then designed (not shown) from a plurality of formed profiles which analogously to the embodiment according to FIG. 6b are arranged one after the other in manner abutting one another and are fastened on the transverse connection elements 344. According to the embodiment according to FIG. 6c, rod-like or tubular centring means 354 are provided, which in the end sections of the formed profiles abutting one another are inserted into a central profile cavity, so that as little offset as possible between the formed profiles occurs in the region of the profile butt joining.

A for example worn or damaged running surface 351 of a formed guide rail 350 can be replaced by another running surface 351 of the same formed guide rail 350, on account of the design of four running surfaces 351 on the same formed guide rail 350. For this, the formed guide rail 350 for example is separated from the transverse connection elements 344, is rotated about the symmetry axis of the point-symmetrical cross section of the formed guide rail 350, until a designed running surface 351 is located in a position, in which the running surface 351 to be replaced was located, and subsequently connected again to the transverse connection elements 344. Thus parts of the conveying chain—here the runner rollers 10—are in contact in each case with other running surfaces 351 of the same formed guide rail 350, depending on the position of the formed guide rail 350. Thus all four running surfaces 351 of the formed guide rail 350 can be used, which results in a fourfold greater life duration in comparison to a guide rail with only one running surface.

The preceding embodiments concerning the shape, fixation, release and use of formed guide rails 350 of course also applies to non-formed guide rails 341 which however externally are designed in the same manner.

Of course the described rolling bodies according to the FIGS. 1 to 6 can also be fastened on the conveying member or the conveying elements (not shown) e.g. via a connection arm.

It is to be expressly specified at this location, that the design of the joint connection according to the embodiment examples described above is not restricted to the design of the conveying means, of the connection means to the conveying means, the runner rollers or their connection to the conveying means or a toothing, but can also be applied in differently designed chain links or conveying means. Moreover, the feature of the tool openings in the carrier elements and the associated plug-in connections are not limited to a specific embodiment of a joint connection, of a conveying element or of a runner roller.

The subsequently listed embodiment variants of specific design aspects on the conveying means can therefore be infinitely combined with one another:
- fastening of the runner rollers on the conveying member or on the chain links;
- design of the runner rollers;
- design of the joint connection;
- design of the conveying member or the conveying elements
- connection of the conveying elements to the chain links;
- design of the longitudinal guiding device.

What is claimed is:

1. A longitudinal guiding device for a conveying device, comprising:
   at least one guide rail with at least one profile body, and
   a holding device with a slot-like receiver,
   wherein the at least one profile body comprises a longitudinally running, cross-sectionally concave recess that defines a guide surface for a conveying means,
   wherein the at least one profile body further comprises a longitudinally running, outwardly directed insert strip;
   wherein the at least one profile body of the at least one guide rail is held on the holding device via the insert strip inserted into the slot-like receiver.

2. A longitudinal guiding device according to claim 1, wherein the profile body is a formed profile which is manufactured from a tubular starting profile which is plastically formed in its cross section.

3. A longitudinal guiding device according to claim 1, wherein the profile body comprises at least two longitudinally running, concave recesses which are arranged on its outer periphery and define guide surfaces.

4. A longitudinal guiding device according to claim 2, wherein the at least one longitudinally running, cross-sectionally concave recess in the formed profile is introduced into the starting profile in a plastic forming method.

5. A longitudinal guiding device according to claim 1, wherein the at least one longitudinally running, cross-sectionally concave recess in the profile body is incorporated into the profile body with an extrusion method or continuous casting method.

6. A longitudinal guiding device according to claim 1, wherein the profile body amid the formation of an X-shaped cross-sectional shape comprises four longitudinally running, cross-sectionally concave recesses which are arranged or incorporated uniformly on its outer periphery.

7. A longitudinal guiding device according to claim 1, wherein the profile body at least in its end sections forms a hollow chamber which is open at the face side and is continuous in a profile longitudinal direction.

8. A longitudinal guiding device according to claim 7, wherein the profile body is a closed hollow profile.

9. A longitudinal guiding device according to claim 2, wherein the formed profile is shaped from a round tube with a circularly cross-sectional or oval cross section.

10. A longitudinal guiding device according to claim 1, wherein the profile body consists of an extrusion profile or continuous cast profile or is plastically formed in its cross section from this.

11. A longitudinal guiding device according to claim 1, wherein the profile body comprises at least two longitudinally running, concave recesses which are adjacent one another and are arranged on the outer periphery of the profile body, and the concave recesses enclose or form a longitudinally running insert strip for insertion into a slot-like recess of a holding device.

12. A longitudinal guiding device according to claim 1, wherein the at least one guide rail is formed from a plurality of profile bodies which are arranged one after the other in the longitudinal direction, end-to-end.

13. A longitudinal guiding device according to claim 7,
wherein in each case two profile bodies forming an end-to-end joining are aligned to one another without offset via a centring means, and
wherein the centring means is a centring pin or centring tube, which is introduced into hollow chambers open at the face side, of the profile bodies, in a manner engaging over the profile, and which is fixed radially in the hollow chambers.

14. A longitudinal guiding device according to claim 1, wherein the longitudinal guiding device comprises two guide rails which are distanced to one another and are guided in parallel and are held via a the holding device and connected to one another.

15. A longitudinal guiding device according to claim 14, wherein the holding device comprises at least one transverse connection element with slot-like receivers, via which the profile bodies of the two guide rails are held and the guide rails are connected to one another.

* * * * *